US010248707B2

United States Patent
Koza (10) Patent No.: US 10,248,707 B2
(45) Date of Patent: *Apr. 2, 2019

(54) REPLICATING DATABASE UPDATES WITH BATCHING

(71) Applicant: INTERNATIONAL BUSINESS MACHINES CORPORATION, Armonk, NY (US)

(72) Inventor: Phillip R. Koza, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,797

(22) Filed: Nov. 14, 2017

(65) Prior Publication Data

US 2018/0096044 A1 Apr. 5, 2018

Related U.S. Application Data

(63) Continuation of application No. 15/281,639, filed on Sep. 30, 2016.

(51) Int. Cl.
*G06F 17/30* (2006.01)

(52) U.S. Cl.
CPC .. *G06F 17/30575* (2013.01); *G06F 17/30368* (2013.01); *G06F 17/30377* (2013.01)

(58) Field of Classification Search
CPC ......... G06F 17/30575; G06F 17/30377; G06F 17/30368
See application file for complete search history.

(56) References Cited

U.S. PATENT DOCUMENTS

| 8,621,109 B2 * | 12/2013 | Matesan | G06F 17/30174 |
| | | | 370/241 |
| 2005/0228802 A1 * | 10/2005 | Kezuka | G06F 3/0605 |
| 2009/0216809 A1 * | 8/2009 | Horii | G06F 17/30448 |

(Continued)

OTHER PUBLICATIONS

List of IBM Patents or Patent Applications Treated as Related; (Appendix P), Filed Nov. 14, 2017; 2 pages.

(Continued)

*Primary Examiner* — Cam Y T Truong
(74) *Attorney, Agent, or Firm* — Cantor Colburn LLP; Robert Bunker (57) ABSTRACT

A computer-implemented method includes detecting a source update applied to a source table, where the source table includes a plurality of columns, and where the source update modifies a first subset of columns of the plurality of columns. A second subset of columns of the plurality of columns is determined, by a computer processor. The second subset of columns has more columns than the first subset of columns and fewer columns than the plurality of columns. Determining the second subset of columns includes determining which of the plurality of columns were updated most recently. The second subset of columns is included in a set clause of an update statement for updating a target table, where the target table is or includes a replica of the source table. The update statement is applied to the target table to achieve at least a minimum batching percentage within a plurality of update statements.

5 Claims, 4 Drawing Sheets

(56) References Cited

U.S. PATENT DOCUMENTS

| | | | |
|---|---|---|---|
| 2013/0070753 A1* | 3/2013 | Sahni | H04L 45/02 370/351 |
| 2016/0203050 A1* | 7/2016 | Hrle | G06F 11/1402 707/625 |
| 2017/0357692 A1* | 12/2017 | Su | G06F 17/30463 |

OTHER PUBLICATIONS

Phillip R. Koza."Replicating Database Updates With Batching", U.S. Appl. No. 15/281,639, filed Sep. 30, 2016.

\* cited by examiner

000## REPLICATING DATABASE UPDATES WITH BATCHING

This application is a continuation of U.S. Non-Provisional application Ser. No. 15/281,639, entitled "REPLICATING DATABASE UPDATES WITH BATCHING," filed Sep. 30, 2016, which is incorporated herein by reference in its entirety.

BACKGROUND

Embodiments of the present invention relate to database systems and, more specifically, to replicating database updates with batching.

In many cases where records in a database are critical enough to warrant redundant record keeping, a target database may be maintained as a backup for a source database. Database replication is then used to keep the target database in sync with the source database. In database replication, when updates are made to the source database, those updates are then applied to the target database as well.

A simple mechanism for applying updates to the target database is to send all columns of the source database to the target database regardless of which columns have changed, and then the target database applies the updates via an update statement where all columns are included in the set clause. Alternatively, the source database can send only those columns that have been updated, and then the target database generates an update statement that changes only the updated columns of the target database. This minimizes the amount of data that is sent over the network and minimizes the number of columns the target database must change.

SUMMARY

According to an embodiment of this disclosure, a computer-implemented method includes detecting a source update applied to a source table, where the source table includes a plurality of columns, and where the source update modifies a first subset of columns of the plurality of columns. A second subset of columns of the plurality of columns is determined, by a computer processor. The second subset of columns has more columns than the first subset of columns and fewer columns than the plurality of columns. Determining the second subset of columns includes determining which of the plurality of columns were updated most recently. The second subset of columns is included in a set clause of an update statement for updating a target table, where the target table is or includes a replica of the source table. The update statement is applied to the target table to achieve at least a minimum batching percentage within a plurality of update statements.

In another embodiment, a system includes a memory having computer readable instructions and one or more processors for executing the computer readable instructions. The computer readable instructions include detecting a source update applied to a source table, where the source table includes a plurality of columns, and where the source update modifies a first subset of columns of the plurality of columns. Further according to the computer readable instructions, a second subset of columns of the plurality of columns is determined. The second subset of columns has more columns than the first subset of columns and fewer columns than the plurality of columns. Determining the second subset of columns includes determining which of the plurality of columns were updated most recently. The second subset of columns is included in a set clause of an update statement for updating a target table, where the target table is or includes a replica of the source table. The update statement is applied to the target table to achieve at least a minimum batching percentage within a plurality of update statements.

In yet another embodiment, a computer program product for replicating database updates includes a computer readable storage medium having program instructions embodied therewith. The program instructions are executable by a processor to cause the processor to perform a method. The method includes detecting a source update applied to a source table, where the source table includes a plurality of columns, and where the source update modifies a first subset of columns of the plurality of columns. Further according to the method, a second subset of columns of the plurality of columns is determined. The second subset of columns has more columns than the first subset of columns and fewer columns than the plurality of columns. Determining the second subset of columns includes determining which of the plurality of columns were updated most recently. The second subset of columns is included in a set clause of an update statement for updating a target table, where the target table is or includes a replica of the source table. The update statement is applied to the target table to achieve at least a minimum batching percentage within a plurality of update statements.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Existing mechanisms for handling database replication have significant drawbacks. If all columns of a source database are sent to a target database for updating, such that the target database applies updates through an update statement where all columns are included in the set clause, then network traffic is not used efficiently, and the target database uses computational time to update columns that have not changed. In contrast, if only the changed columns are sent to the target database, then batching cannot be performed efficiently in applying updates to the target database.

Because each update modifies only a subset of the columns in a table of a database, each set clause of an update statement might be different than the set clause in the preceding update statement, where the set clause indicates which columns are being updated. Most database drivers, such as those in Java Database Connectivity (JDBC) or Open Database Connectivity (ODBC), or a native database driver, provide a way to batch database operations. In batching, multiple operations use the same prepared statement, with different parameter values, and are thus submitted as a single request. Batching is possible only if consecutive operations use the same prepared statement. If consecutive update statements have different set clauses, then each such update statement requires a different prepared statement, and thus, these update statements cannot be batched. To apply an update statement with a different set clause than that of the previous update statement, the batch that was in progress is submitted and a new batch is started. This is called "breaking the batch."

Breaking the batch occurs when a statement has a different set clause than a previous statement, a different operation (e.g., insert versus update) than the previous, or applies to a different table than the previous. Breaking the batch increases the number of prepared statements that must be compiled since a new prepared statement is started each time the batch is broken.

Some embodiments of a replication system described herein make strategic decisions as to which columns are sent from the source database to the target database, so as to keep network traffic and database computation low while keeping the level of batching high. Specifically, in some embodiments, columns are selectively sent to the target database for updating so as to achieve a required level of minimum batching, and not all columns of a table need to be sent to achieve this purpose. To this end, the replication system may use a mathematical formula to determine the minimal number of times an unchanged column is included in the set clause to ensure a guaranteed minimum batching level. Further, the replication system may use an efficient algorithm to keep track of the columns that have not changed in the source table and the number of times they have not been changed.

Figure 1:
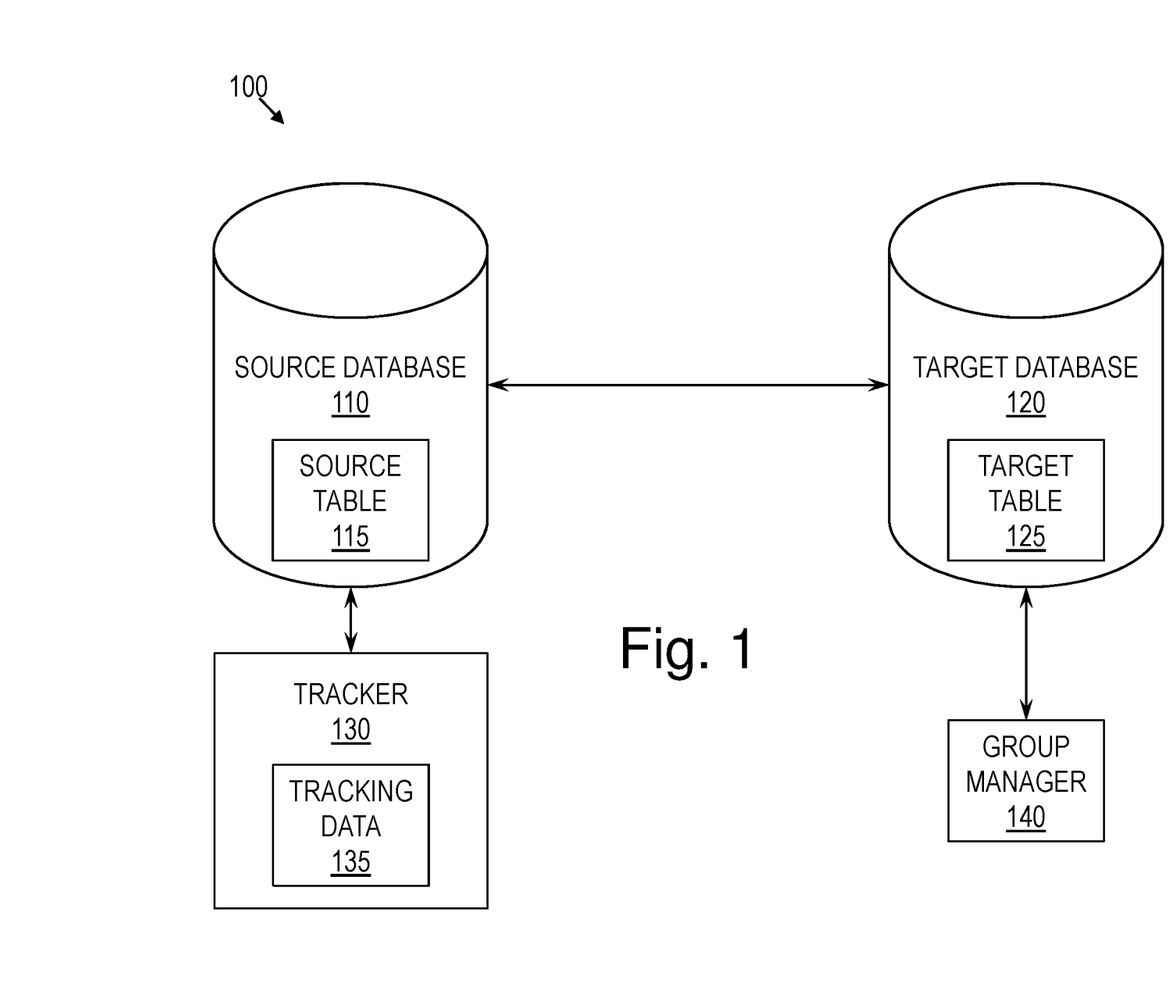
FIG. 1 is a diagram of a replication system, according to some embodiments of this invention.

FIG. 1 is a diagram of a replication system 100, according to some embodiments of this invention. As shown, the replication system 100 may replicate updates of a source table 115 in a source database 110 to a target table 125 in a target database 120. The replication system 100 may include at least one tracker 130 that maintains tracking data 135 describing when each column of the source table 115 was last changed, as will be described further below. Based on this tracking data 135, the replication system 100 may make decisions about which columns to update in the target table 125 to achieve a minimum batching level. Additionally, in some embodiments, the replication system 100 may include a grouping manager 140, which may reorder and group operations before applying them to the target database 120.

In some embodiments, as shown in FIG. 1, the tracker 130, along with its tracking data 135, may reside locally to the source table 115 and may be in communication with the source table 115. In this case, the tracker 130 may determine which columns are to be updated in the target table 125, based on the tracking data. The source table 115 may then transmit to the target table 125 only those columns that the tracker 130 deems should be updated.

Figure 2:
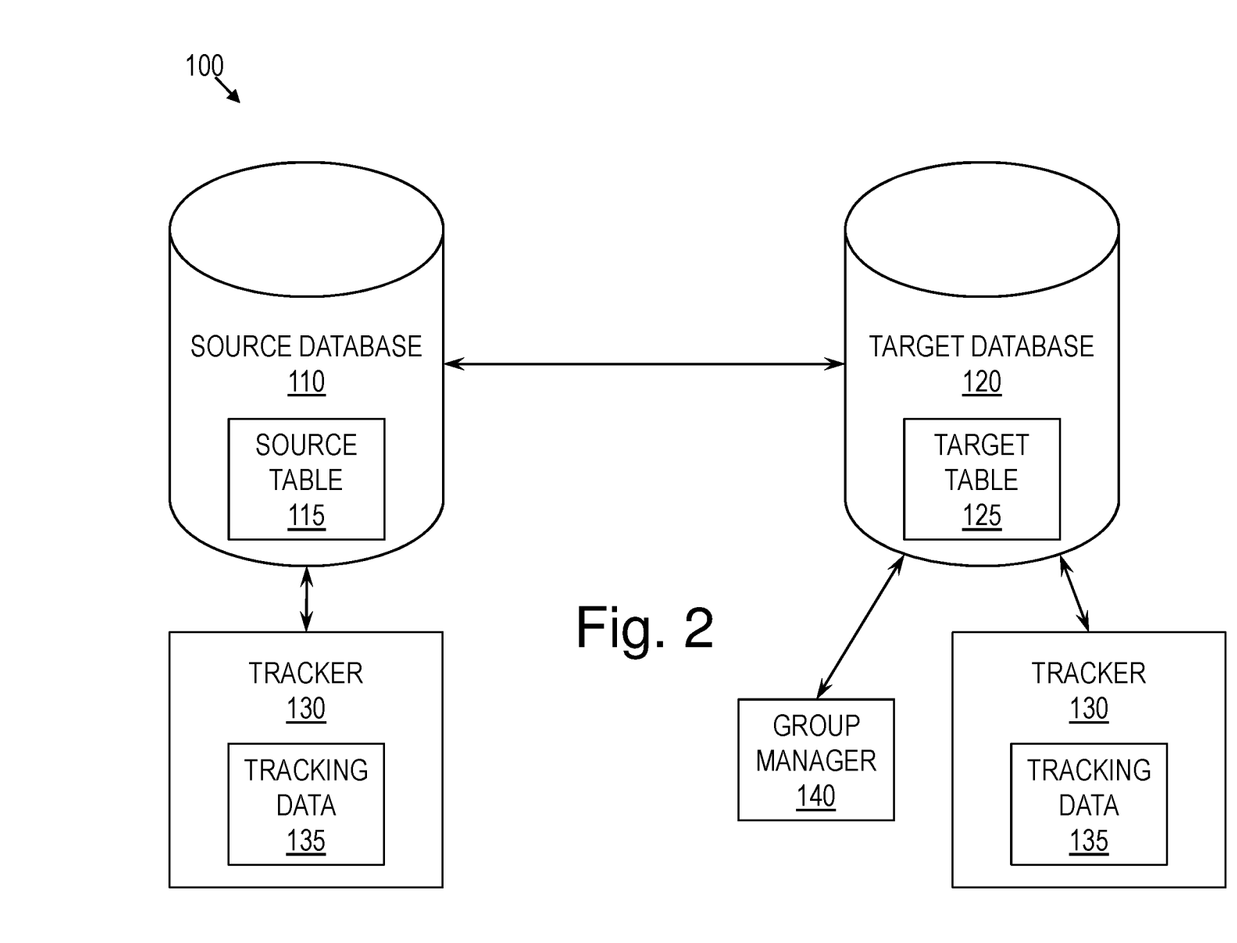
FIG. 2 is another diagram of the replication system, according to some embodiments of this invention.

FIG. 2 is another diagram of the replication system 100, according to some embodiments of the invention. FIG. 2 illustrates that, in some embodiments, an instance of the tracker 130 may reside locally to and in communication with the source table 115, while another instance of the tracker 130 may reside locally to and in communication with the target table 125. In this case, the tracker 130 in communication with the source table 115 may determine which columns are to be updated in the target table 125, based on the tracking data 135. The source table 115 may then transmit to the target table 125 only those columns that the tracker 130 deems should be updated.

In some embodiments, as shown in both FIGS. 1-2, the tracker 130 is included at the source table 115 regardless of whether the tracker 130 is also included at the target table 125. As a result, network traffic can be reduced by transmitting from the source table 115 to the target table 125 only those columns that should be updated based on the tracking data, as compared to sending every column for every update.

Further, in some embodiments, primary-key values for rows to be updated are always sent from the source table 115 to the target table 125 because, otherwise, the replication system 100 would be unable to identify which rows to update on the side of the target table 115. By including the tracker 130 at the target table 125 as well as the source table 115, the replication system 100 can track these primary-key values being updated at the target table 125. As a result, primary-key columns may be sometimes be included along with other columns in a set clause for updating the target table 125. Because the tracker 130 may be lightweight, little cost is incurred through using more than a single instance of the tracker 130.

Alternatively, in some embodiments, if primary-key columns are excluded from updates to the target table 125, as is a viable option since primary-key columns rarely or never change, then a tracker 130 need not be included in communication with the target table 125.

Although only a single source table 115 and target table 125 are shown in FIGS. 1-2, it will be understood that the source database 110 may include multiple source tables 115 whose updates are being replicated to multiple corresponding target tables 125 of the target database. For each source table 115 and its corresponding target table 125, the replication may proceed as described in this disclosure.

Further, it will be understood that, as the target table 125 is or includes a replica of the source table 115 in some embodiments, certain properties attributed to the target table 125 (e.g., column size, number of columns, number of non-key columns) in this disclosure may likewise apply to the source table 115. Similarly, certain properties attributed to the source table 115 may likewise apply to the target table 125.

Generally, the source table 115 may be updated from time to time, and each update may affect at least one column of the source table 115. The replication system 100 may seek to apply these updates to the target table 125. In some embodiments, the replication system 100 may have two modes, a selective mode and a full mode. When operating in the full mode, the replication system 100 may simply update all columns of the target table 125 in response to each update at the source table 115, so as to achieve high batching. The full mode may be activated, for example, when a user activates an "adaptive apply" option to ensure each row of the target table 125 is synchronized with the source table 115 when the user has modified a row of the target table 125 directly. Otherwise, the replication system 100 may use the selective mode, in which the replication system 100 selects with columns to update in the target table 125 as described in detail below.

For each column in the source table 115, the tracker 130 may monitor how many times the source table 115 was updated without an update to that column. In other words, the tracker 130 may monitor how many modifications (e.g., inserts, deletions) of the source table 115 have occurred since the last modification to the column. To this end, the tracker may maintain a tracking count associated with each column. When the source table 115 is updated without an update to a column, the tracker 130 may increment the tracking count for that column. However, when an update to the source table 115 includes an update to the column, the tracker 130 may reset the corresponding tracking count, such as by setting it to a value of zero.

To additionally track which columns have not yet been updated, each tracking count may be initialized to a value of −1 before tracking begins. Thus, in some embodiments, a value of −1 in the tracking count corresponding to a column indicates that the column has not been updated since tracking began. When an update occurs to the source table 115 but not to the column, the value of the tracking count may remain at −1, continuing to indicate that the column has not yet been updated. When an update occurs to that column, the tracker 130 may reset the value of the tracking count to 0. From that point forward, the tracking count of the column may be incremented each time the source table 115 is updated without an update to the column.

The replication system 100 may apply an update to the target table 125 for each update to the source table 115. However, each update to the target table 125 may include additional columns in the update set as compared to the columns actually modified by the update to the source table 115. Specifically, when a source update occurs at the source table 115, the replication system 100 may include, in a set clause of an update statement for the target table 125, each column that was changed by the source update as well as each column that was recently changed by a previous source update to the source table 115.

In this manner, the replication system 100 may provide a good tradeoff between increased batching and applying updates to unchanged columns. It could be wasteful to include a column in the update set when no change has been made to that column, simply to decrease the possibility of breaking the batch through a modification of an additional column in the next update. By determining which columns were recently changed and including those columns in the set clause, the replication system 100 may increase batching without including columns that are unlikely to be modified in the near future.

In some embodiments, whether a column was "recently changed" depends on the tracking data 135, as will be described further below. Further, in some embodiments, the definition of "recently changed" for the purpose of determining whether to include a column in a set clause may be dynamic, as will also be described further below.

The target table 125 and the source table 115 may be associated with a change threshold, which may be dynamic. Generally, a column may be considered recently changed if its associated tracking count (i.e., the number of updates occurring to the source table 115 since the last update to the column) is less than or equal to the change threshold. The value of the change threshold may affect batching, in that a higher value may lead to updating columns in the target table 125 that did not need to be updated to achieve a high level of batching, while a lower value may lead to batches being broken too frequently.

In some embodiments, one factor in defining the change threshold is the number of columns in the source table 115. If the source table 115 has only one column, then there can be only one set clause for update statements, and all columns may be updated at each update to the target table 125. In many cases, the source table 115 may have a set of primary-key columns, containing primary keys that identify each row, and those primary-key columns are never or rarely updated. If a source table 115 has only one non-key column (i.e., a column that is not a primary-key column), then all such columns may be updated with each update to the target table 125. Thus, the replication system 100 may be beneficial for source tables 115 with two or more non-key columns and may particularly be beneficial for source tables 115 with numerous non-key columns. More generally, the choice of a change threshold may be dependent on the maximum number of columns that might not be updated in a given update, because those columns might appear in a later update and cause a batch the broken.

If a table has N columns, then in an update, there are at most N−1 unchanged columns as at least one column is changed in the update. In some embodiments, if the change threshold is set to the maximum number of unchanged columns, N−1, then at least two operations for every N contiguous update operations are batched together. However, in some embodiments, if the change threshold is set to 2×(N−1), then at least 50% batching of contiguous update statements is achieved. It will be understood that these numbers represent the worst case.

To demonstrate the above, an example includes a source table 115 and a target table 125 with eight columns each, such that N−1=7. The column names are A, B, C, D, E, F, G, H. The worst case for batching will be when each update modifies only one column, and the columns are updated almost, but not exactly, such that all columns are updated before any are repeated. Suppose a sequence of updated columns is B, C, D, E, F, G, H, A. In some embodiments, if the change threshold is set to seven, then after column B is updated, column B will be included in the next seven updates, even though column B is not being updated in those next seven updates. If the columns are being updated in the same repeated sequence, then the next update after those seven will be on column B again. Since column B is being updated, column B is included in the update set, which matches the previous update set, so that update will be batched with the previous update. If the sequence is preserved, the next update will be on column C. Analogous events occur, and the result is 100% batching.

In contrast, the sequence can be slightly off, such as a repeating update series of B, C, D, E, F, G, H, A, A. In this example, in some embodiments, when column A is updated for the second time, column B is dropped for not being updated, and thus the batch is broken. The next update, however, is once again on column B, and again the batch is broken as column B is added and column C is dropped. This batch-breaking continues until the next update of column A when the sequence repeats. In this case, column A is still in the set clause, since the second update of A reset the count for column A. Thus, this update of column A is batched with the previous update of column H, where the set clause includes all columns. However, the batch is broken on the next update of column A because column B is then dropped. In this worst-case scenario, with a change threshold of seven, some embodiments of the replication system 100 batches every two operations out of nine. However, if the change threshold is set to a value of 2×(N−1)=14, then some embodiments of the replication system 100 batches every nine operations out of sixteen operations. By including non-updated columns for an extra seven operations, in some embodiments, the replication system 100 is able to batch an additional seven operations.

Following is an analysis of how to choose a value of the change threshold, according to some embodiments:

Where MaxCols represents the maximum number of columns that might not be updated when an update occurs, suppose that MaxCols=N−1, where N remains the total number of columns in each of the source table 115. In this analysis, there also exists a multiplier Factor, by which MaxCols is multiplied as described below. For MaxCols>0 and Factor≥1, the equation to determine a minimum batching percentage, MinBatchP, is MinBatchP=((MaxCols× (Factor−1))+2)/(MaxCols×Factor+2).

According to some embodiments, in the above, the denominator is the worst interval at which a column can be updated, in that the column is not included in the set clause, thus causing a batch break, and is then immediately re-added to the set clause. Thus, to analyze how to define the change threshold, it is useful to count the number of operations batched out of this many updates.

Regarding the numerator, at Factor=1, at least two operations will get batched, in some embodiments. This is due to the slight overlap between the definition of MaxCols and the total number of columns. If MaxCols were defined to be one less, the result would be 0% minimum batching at Factor=1, according to some embodiments.

Suppose the change threshold, T, is set to MaxCols× Factor. This value, T, may be the number of times a column that has been updated at least once is allowed to be unchanged by an update before it is not included in the set clause.

Using the equation above, a minimum batching percentage can be determined for given MaxCols and Factor. However, what is desired for the replication system 100 is to be able to determine Factor given MaxCols and the desired minimum batching percentage. Solving the above equation for Factor gives the following:

$$MinBatchP=(MaxCols\times(Factor-1))+2)/((MaxCols\times Factor)+2)$$

$$MinBatchP=(MaxCols\times Factor-MaxCols+2)/(MaxCols\times Factor+2)$$

$$MinBatchP\times(MaxCols\times Factor+2)=MaxCols\times Factor-MaxCols+2$$

$$MinBatchP\times MaxCols\times Factor+2MinBatchP=MaxCols\times Factor-MaxCols+2$$

$$2MinBatchP=MaxCols\times Factor-MinBatchP\times MaxCols\times Factor-MaxCols+2$$

$$2MinBatchP+MaxCols-2=MaxCols\times Factor-MinBatchP\times MaxCols\times Factor$$

$$2MinBatchP+MaxCols-2=(MaxCols-MinBatchP\times MaxCols)\times Factor$$

$$(2MinBatchP+MaxCols-2)/(MaxCols-(MinBatchP\times MaxCols))=Factor$$

Therefore, the multiplier Factor=(2MinBatchP+Max-Cols−2)/(MaxCols−(MinBatchP×MaxCols)). Factor can thus be determined from the minimum batching percentage, MinBatchP, and the maximum number of columns not updated, MaxCols.

In one example, suppose MinBatchP=9/16=0.5625 and MaxCols=7. In that case, Factor=(2MinBatchP+MaxCols−2)/(MaxCols−(MinBatchP×MaxCols))=6.126/3.0625=2.

Thus, to guarantee a min batching percentage of 56.25% with MaxCols=N−1=7, a multiplier of Factor=2 is used in some embodiments. For such embodiments, the change threshold may therefore be set to T=2×(N−1)=14.

Based on the above equations, given a desired minimum batching percentage along with a number of maximum columns that might not be updated in a given update (e.g., N−1), the multiplier Factor may be determined to guarantee the minimum batching percentage.

In some embodiments, the replication system 100 may automatically select a minimum batching percentage. Various factors can be considered when doing so. For instance, the minimum batching level may be selected based on the resource cost of batch breaks versus the resource savings of not updating unchanged columns.

Some experiments have shown that batch breaks are the least harmful (i.e., have the least cost) when each update modifies a single column and when the updates almost always modify the same column. This is because, for every batch that is broken, there were many update operations for which only a single column was updated, rather than multiple columns, and single-columns updates can be relatively cheap. This "best" cases for batch breaks can be handled well if the definition of MaxCols is modified from MaxCols=N−1. Rather, if the value of MaxCols is set to the minimum of N−1 and the number of columns that have been changed at least once in a current replication session (e.g., the period during which the replication system 100 has been running on the source table 115 and the target table 125). With this change, the number of update operations that include unchanged columns can be reduced. This change to the definition of MaxCols can be made while still guaranteeing the minimum batching percentage, because the actual number of columns being updated is less than N and thus the number of possible set clauses is reduced as well. Even if every column is occasionally updated and the minimum batching percentage is low, the replication system 100 can still perform well because the reward for not updating all columns is high.

Experiments have further shown that batch breaks cause the most harm to performance (i.e., have the greatest cost) when most of the updates are modifying approximately 50% of the columns, and the mix of columns differs with each update. Regarding this "worst" case, only a small benefit is gained for every batch that is broken, since the replication system 100 may continue to update approximately 50% of the columns after the batch break. For these cases, an appropriate minimum batching percentage for a given source table 115 can be particularly useful. Source tables 115 with many expensive-to-update columns (e.g., columns holding large data) may experience greater benefit in not updating all columns as compared to source tables 115 with columns that are relatively cheap to update (e.g., integers).

Further experiments have been performed to determine the crossover point for a typical source table 115 with a mix of inexpensive and expensive columns to update. The crossover point is the point at which, for the worst case described above, it would have been better to update all columns rather than updating select columns as described herein. In the experiments, the crossover point occurred at an approximately 66% minimum batching percentage. Thus, for the worst case in these experiments, the minimum batching percentage was at least 66% for it to be worthwhile not to simply update all columns of the target table 125 in response to an update to the source table 115. For some source tables 115, the crossover point will be lower, and for some it will be higher.

Given that the minimum batching percentage is a minimum, and is thus higher in most cases, the replication system 100 may use a minimum batching percentage of 50% in some embodiments. This can provide a good balance between avoiding updating columns that did not change and potentially breaking the batch. For source tables 115 with a large number of columns that are inexpensive to update, the minimum batching percentage may be set higher, while the minimum batching percentage may be set lower for source tables 115 with a large number of columns that are expensive to update.

In some embodiments, the replication system 100 may automatically select a minimum batching percentage, MinBatchP, from which it may determine a value for the multiplier, Factor, and thus the change threshold. The minimum batching percentage may be determined based on, for example, the size of values of the various columns of the source table 115 or on which proportion of the columns are generally modified for each update, as described above, or on other factors. Further, in some embodiments, the replication system 100 may dynamically change the minimum batching percentage as updates continue to occur, based on workload changes or other factors. The multiplier and change threshold may thus change dynamically as well, based on the minimum batching percentage. In some embodiments, however, a designer or administrator of the replication system 100 may select the minimum batching percentage, and the replication system 100 may determine the multiplier and change threshold based on this value.

In some cases, a batch can be broken for reasons other than mismatched set clauses. When a stream of operations is applied to a database, such as the source database 110, an operation on a different table or a non-update operation on the same table will break any in-progress batch of update operations. However, some embodiments of the replication system 100 may reduce these types of batch breaks by having the grouping manager 140 reorder the operations such that operations are grouped by the table and by operation type. The grouping manager 140 may then apply each group of operations. One of skill in the art will understand that the minimum batching percentage is only guaranteed, in some embodiments, when updates are grouped together or otherwise uninterrupted by other operations when applied In some embodiments, the reordering of operations for grouping is possible performed when there are no cross-row dependencies, such as referential integrity constraints, as well as no triggers or stored procedures that expect operations to be applied in the original order as applied to the source database 110. Absent such restrictions, operations on a first target table 125 replicating those of a first source table 115 may be applied as a group, operations on a second target table 125 replicating those of a second source table 115 may be applied as a group, operations on a third target table 125 replicating those of a third source table 115 may be applied as a group, etc. Within operations performed on the same target table 125, the replication system 100 may group the operations by operation type and may eliminate or combine operations that apply to a common row. In some embodiments, this can be implemented by hashing first on a name of the target table 125 and then hashing on a primary key of the common row.

More specifically, the replication system 100 may do the following to reorder operations before applying them to the target database 120, where these operations have already occurred at the source database 110:

(1) If a delete is seen on a row that was previously updated, discard the update.
(2) If a delete is seen on a row that was previously inserted, discard the insert and the delete.
(3) If an update is seen on a row that was previously inserted, merge the update into the insert.
(4) Only keep the latest update on a row.
(5) Deletes are performed first.
(6) Inserts are performed after the deletes.
(7) Updates are performed after the deletes and inserts.

One of skill in the art will understand that the above reordering differs from "bulk apply" techniques, which transform each update into a delete followed by an insert so that all the inserts can be applied by a bulk loader utility.

The replication system 100 may apply the reordered operations either in serial or in parallel. With the operations reordered as described above, in some embodiments, a remaining barrier to a high level of batching is update operations with mismatched set clauses, which is addressed by the replication system 100 as described throughout this disclosure.

In some cases, the replication system 100 may also reorder update operations to be made to a target table 125. In certain instances, this can provide a high level of batching for update statements without having to add unchanged columns to the set clause. In one example, a pair of operations is repeated numerous times, such as the pair "update Tab100 set colA=?" and "update Tab100 set colB=?" being repeated 10,000 times, where these updates always apply to different rows and thus cannot be merged. The replication system 100 may reorder these operations so that all the updates on colA occur before any of the updates on colB, and the result may be a high level of batching without having to update an unchanged column.

This technique of reordering update statements can be effective at increasing batching if there are updates on a target table 125, where those updates have a common set clause and are available to be grouped together. Even if groups of operations with the same set clause can be formed, the batch size may be limited by the number of operations with the same set clause. If the set clauses changed constantly, for example such that the update sets of the set clauses were [colA], [colA, colB, colC], [colB], [colC], [colB, colC], [colA, colB], etc., then according to some embodiments, none of these updates could be batched together without adding recently changed columns. However, all of these other than the operation with the first update set above could be batched together by adding recently changed columns to the set clause.

To implement this form of grouping, the replication system 100 may ensure that operations on a single row are consolidated, using a hash table. The replication system 100 may then group the resulting consolidated update operations by their set clauses. In some embodiments, this may be implemented by hashing again on the update set columns, but this can cause additional computational expense. Thus, in some embodiments, reordering of update operations may be performed only in the cases where the total number of updates on the target table 125 divided by the number of distinct set clauses in the updates without adding columns for unchanged values, where "distinct" set clauses do not have the exact same update set, is greater than or equal to a preferred batch size. Otherwise, in some embodiments, the replication system 100 does not reorder the update operations, but rather relies on the tracking data 135, as described above, to achieve a high level of batching for update statements.

Figure 3:
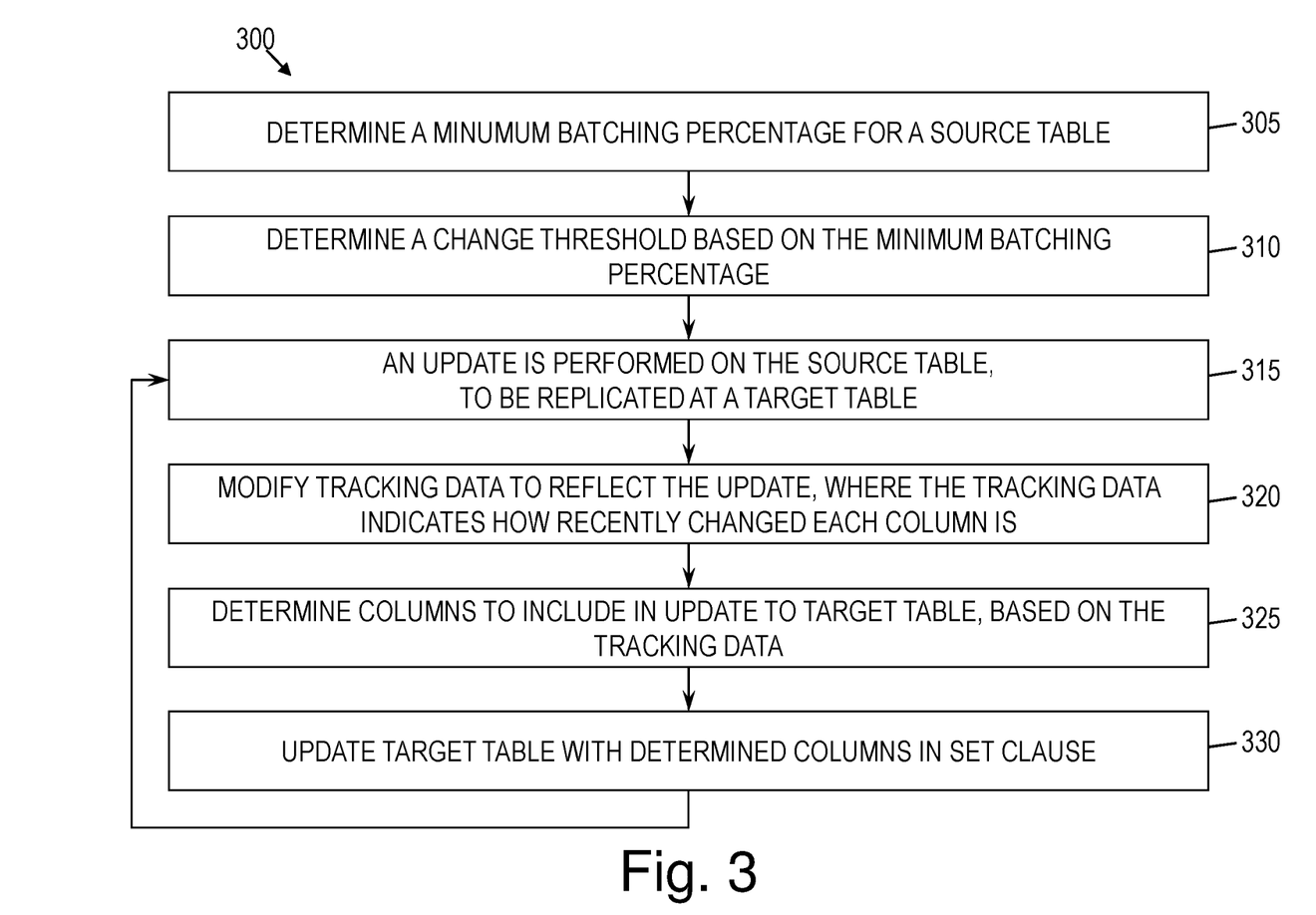
FIG. 3 is a flow diagram of a method for replicating database updates, according to some embodiments of this invention.

FIG. 3 is a flow diagram of a method 300 for replicating database updates, according to some embodiments of this disclosure. As shown, at block 305, the replication system 100 may determine a minimum batching percentage for a source table 115, as discussed above. At block 310, the replication system 100 may determine a change threshold, based on the minimum batching percentage. In some embodiments, this may be performed by determining a multiplier based on the minimum batching percentage, and by determining the change threshold based on both the minimum batching percentage and the multiplier. At block 315, an update may be performed at the source table 115, for which updates are to be replicated to a target table 125. At block 320, the tracking data 135 may be updated to reflect, for each column, how many updates have occurred on the source table 115 since the last time that column was updated. In other words, the tracking count for each column modified in the update may be reset to zero, and the tracking count greater than or equal to zero for each column unmodified by the update may be incremented. At block 325, the replication system 100 may determine based on the tracking data 135 which columns of the source table 115 are to be included in a set clause of an update to the target table 125. Specifically, in some embodiments, the columns included may be each of those whose tracking count is less than or equal to the change threshold. In some embodiments, by including these columns in an update to the target table 125, the minimum batching percentage may be achieved. At block 330, the target table 125 is updated with the determined columns in the set clause. Blocks 315 through 330 may be repeated with each update to the source table 115.

Figure 4:
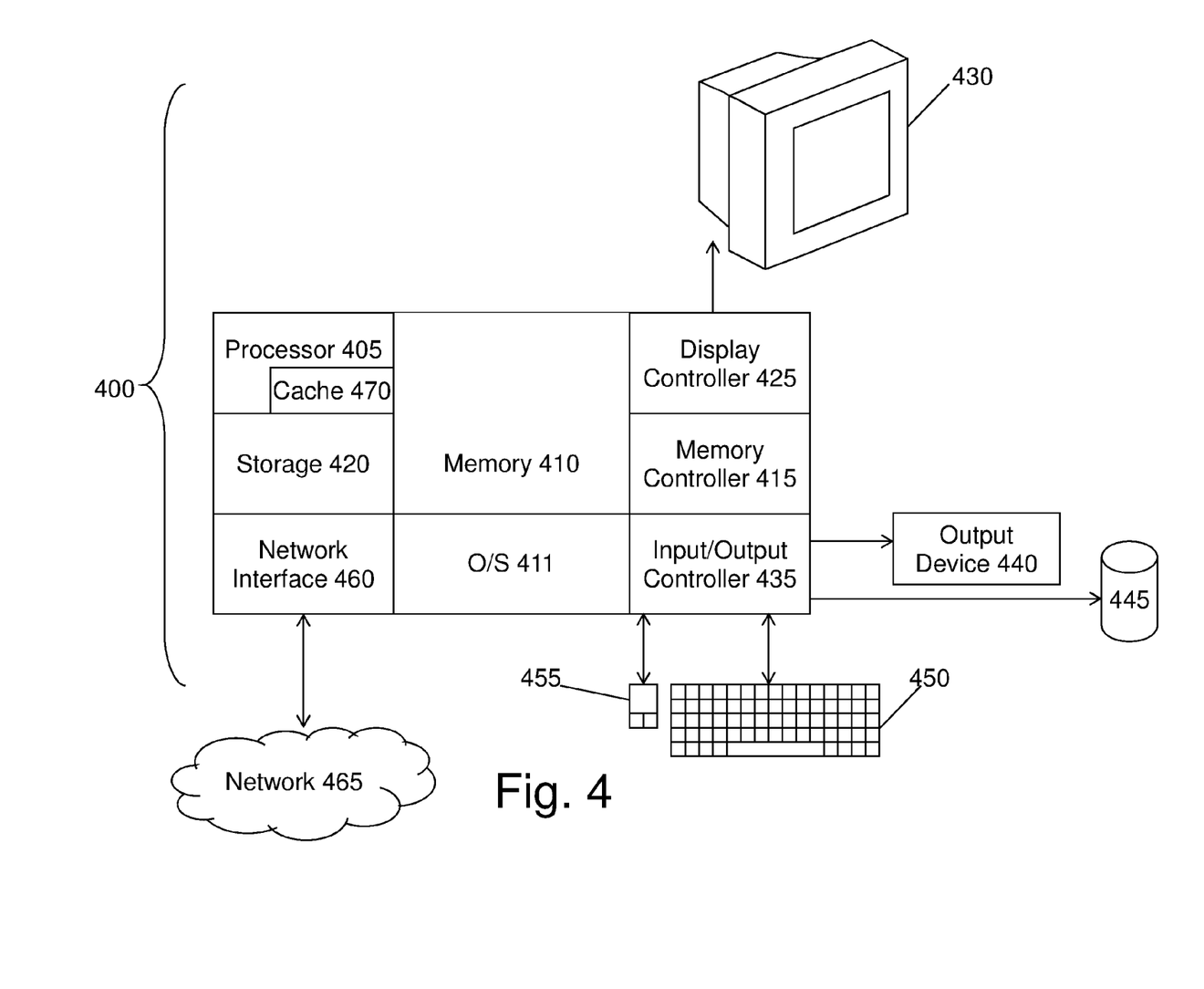
FIG. 4 is a diagram of a computer system for implementing some or all aspects of the replication system, according to some embodiments of this invention.

FIG. 4 illustrates a block diagram of a computer system 400 for use in implementing a replication system 100 or method according to some embodiments. The replication systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the replication systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Replication systems 100 and methods according to this disclosure may be embodied, in whole or in part, in computer program products or in computer systems 400, such as that illustrated in FIG. 4.

Technical effects and benefits of some embodiments include the ability to guarantee a minimum batching percentage in replicating database updates from a source table 115 to a target table 125. This may be achieved by including in each update to the target table 125 each column that was recently updated, where "recently updated" is determined based in part on the minimum batching percentage. As a result of the guaranteed minimum batching percentage, performance of the replication can be improved over the existing art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a computer processor, a minimum batching percentage for a source table;
   determining, by the computer processor, a change threshold based on the minimum batching percentage;
   detecting, by the computer processor, a source update applied to the source table, wherein the source table comprises a plurality of columns, and wherein the source update modifies a first subset of columns of the plurality of columns;
   determining, by the computer processor, a second subset of columns of the plurality of columns, wherein the second subset of columns comprises more columns than the first subset of columns and fewer columns than the plurality of columns, wherein the determining the second subset of columns comprises determining which of the plurality of columns were updated most recently, and wherein a respective tracking count of each column in the second subset of columns is less than or equal to the change threshold;
   including, by the computer processor, the second subset of columns in a set clause of an update statement for updating a target table, wherein the second subset of columns included in the set clause comprise more columns than the first subset of columns modified by the source update, wherein the second subset of columns comprise fewer columns than the plurality of columns in the source table, and wherein the target table comprises a replica of the source table; wherein the change threshold is a number of times a column that has been updated at least once and is allowed to be unchanged by an update before the column is not included in the set clause; and
   updating, by the computer processor, one or more columns of the target table responsive to the source update at the source table by applying the update statement to the target table to achieve at least the minimum batching percentage within a plurality of update statements, wherein the applying the update statement comprises batching the update statement with a set of one or more previous update statements applicable to the target table, and wherein the minimum batching percentage is a guaranteed minimum percentage of update statements batched together when the plurality of update statements are performed in sequence, uninterrupted by other database operations.

2. The computer-implemented method of claim 1, wherein the determining which of the plurality of columns were updated most recently comprises: updating tracking data based on the source update, wherein the tracking data comprises a plurality of tracking counts, comprising a tracking count associated with each column of the plurality of columns; wherein the tracking count associated with each column indicates how many times the source table has been updated since the column was last updated.

3. The computer-implemented method of claim 1, wherein the determining the change threshold is further based on a size of the source table.

4. The computer-implemented method of claim 1, further comprising wherein the determining the minimum batching percentage is based at least in part on how many of the plurality of columns are expensive to update.

5. The computer-implemented method of claim 1, further comprising reordering a plurality of operations applicable to the target database, wherein the target table is at least a portion of the target database, to group a plurality of updates together to enable batching to occur on the plurality of updates.

* * * * *